United States Patent [19]

Ohta et al.

[11] Patent Number: 4,649,404
[45] Date of Patent: Mar. 10, 1987

[54] RECORDING APPARATUS

[75] Inventors: Morio Ohta; Shizuo Tsuchiya, both of Higashiyamatoshi, Japan

[73] Assignees: Casio Computer Co., Ltd.; Casio Electronics Manufacturing Co., Ltd., both of Tokyo, Japan

[21] Appl. No.: 792,256

[22] Filed: Oct. 28, 1985

[30] Foreign Application Priority Data

Nov. 5, 1984 [JP]  Japan ................................. 59-232835

[51] Int. Cl.$^4$ ........................................... G01D 15/14
[52] U.S. Cl. .................................... 346/160; 400/119; 346/154
[58] Field of Search .................. 346/76 PH, 160, 154; 400/119; 101/DIG. 13

[56] References Cited

U.S. PATENT DOCUMENTS 4,368,491  1/1983  Saito .............................. 346/76 PH
4,536,778  8/1985  De Schamphelare et al. ..... 346/160

Primary Examiner—Arthur G. Evans
Attorney, Agent, or Firm—Sandler & Greenblum

[57] ABSTRACT

A recording apparatus is capable recording information by light passed through the light shutter. When the information is recorded on to a sheet of paper, the recording apparatus controls that area on the paper where information is to be recorded, and it comprises plural AND or OR gates, counters and flip-flop circuits. The area on the paper where the information is to be recorded is indicated by an effective writing signal applied from a means located outside and recording data applied from a means located outside is recorded on to the sheet of paper responsive to this effective writing signal.

17 Claims, 16 Drawing Figures

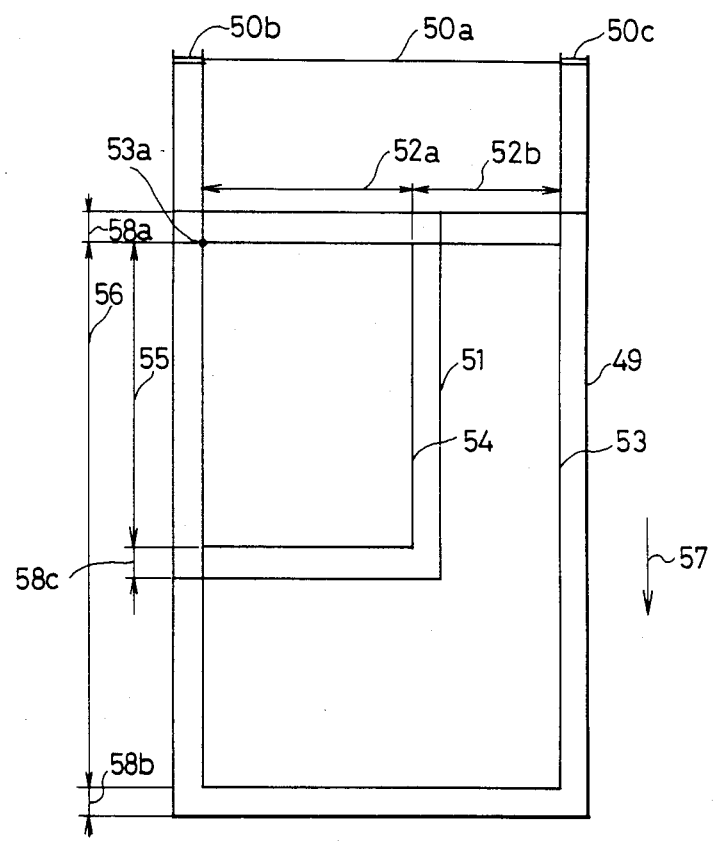

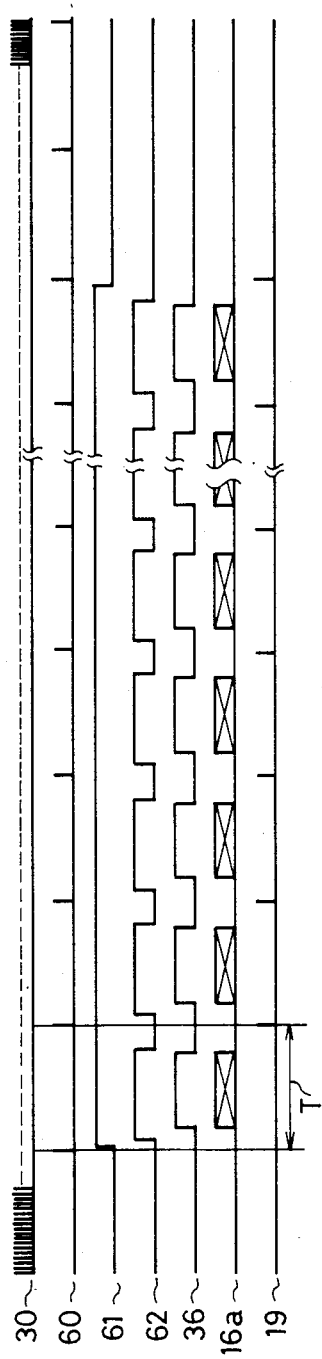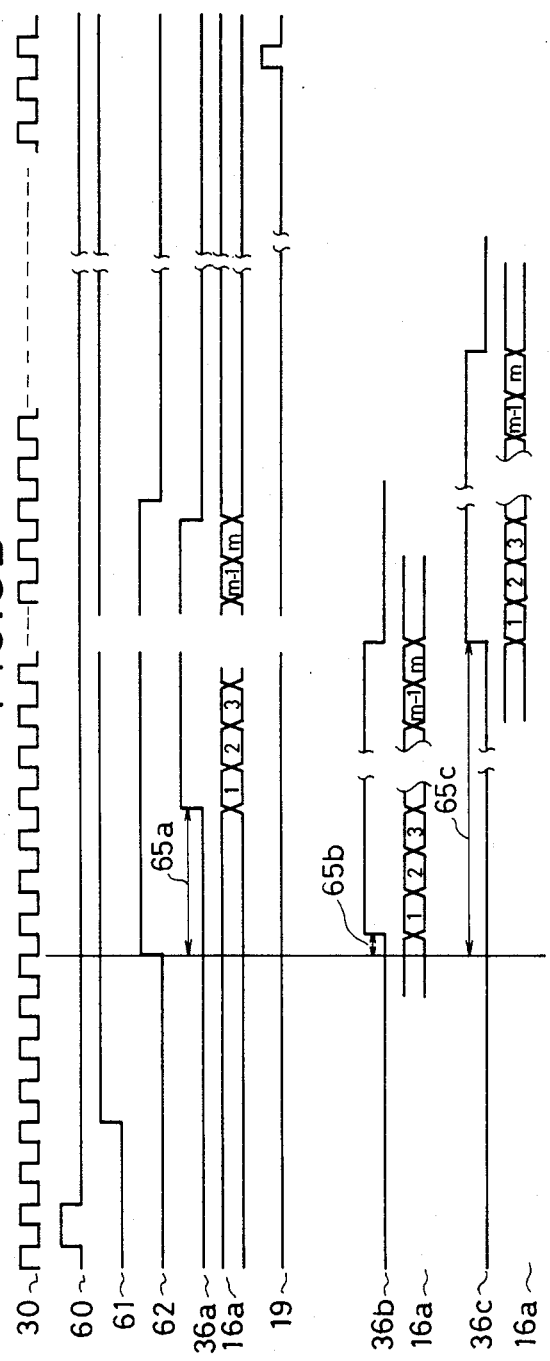

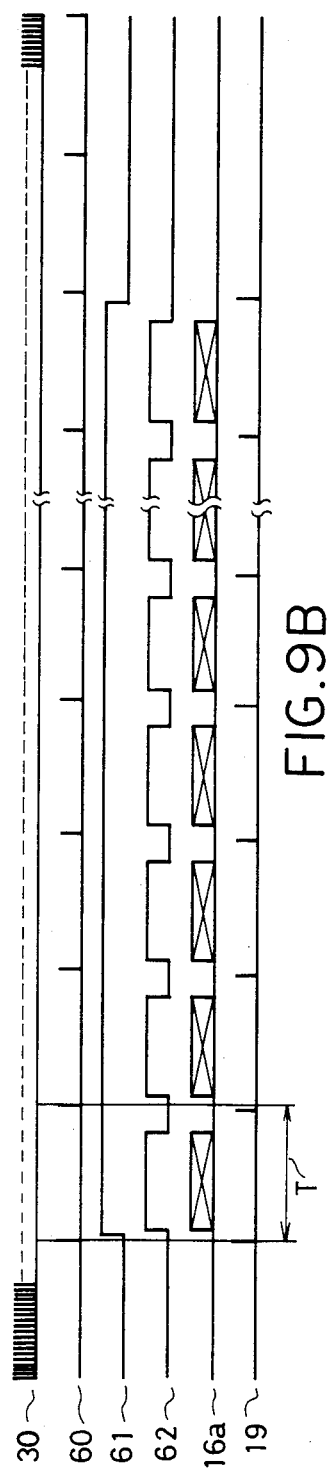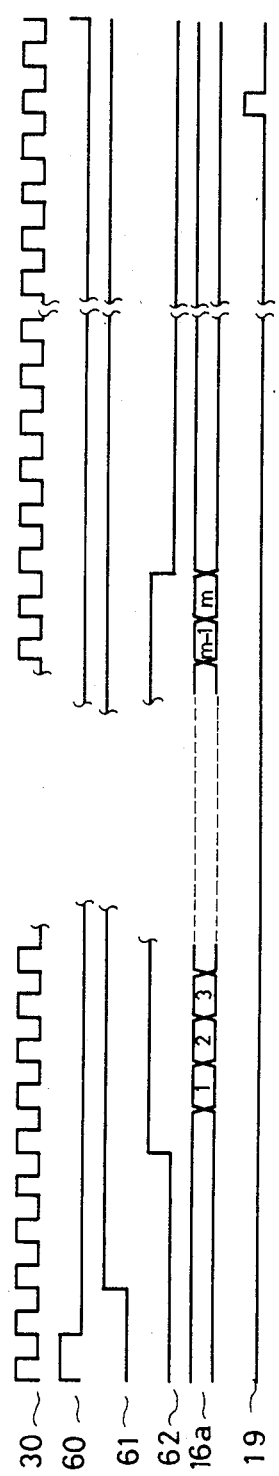

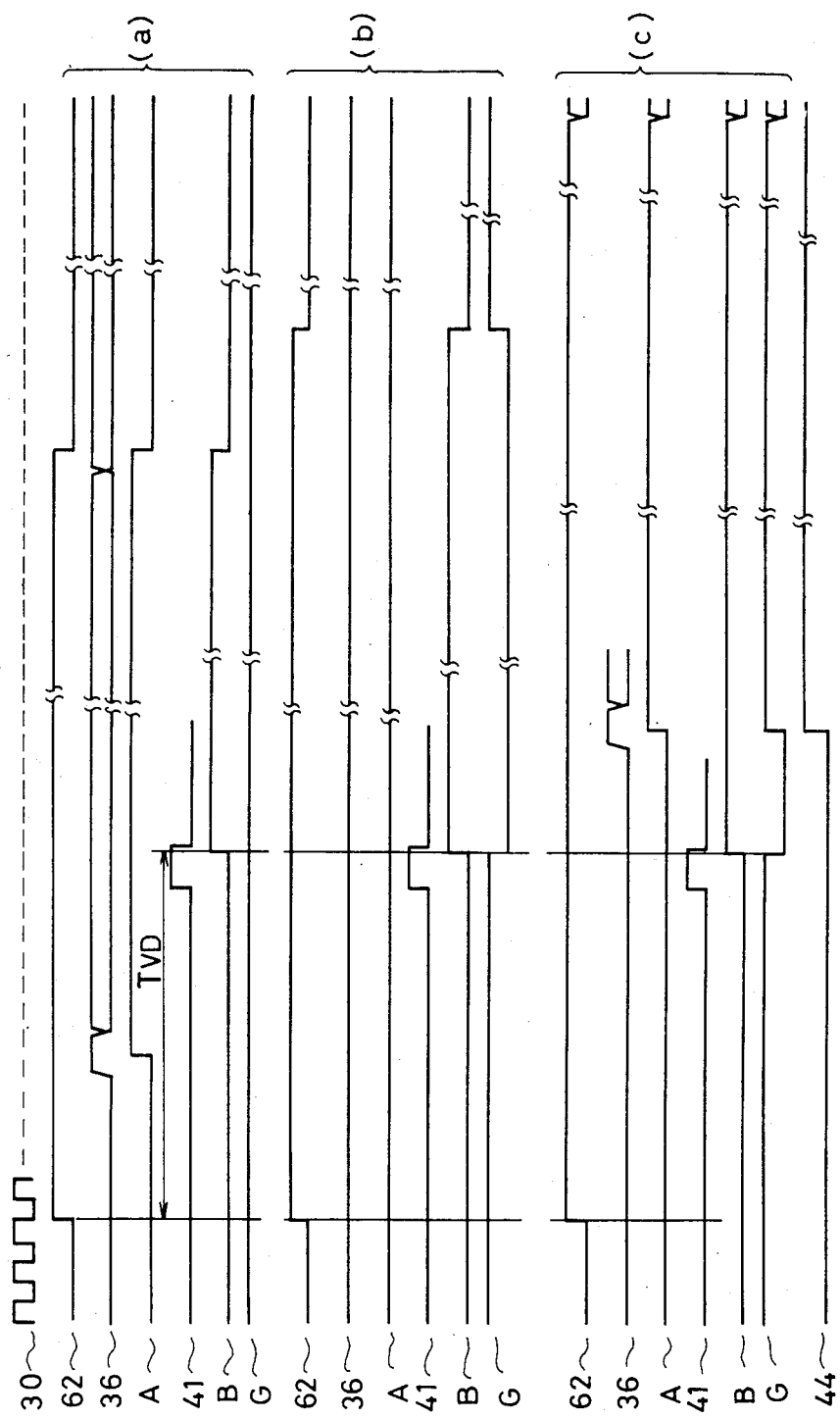

RECORDING APPARATUS

BACKGROUND OF THE INVENTION

1. Field of the Invention

The present invention relates to a recording apparatus, and more particularly, it relates to a printing control circuit for the light shutter.

2. Prior Art

The optical recording apparatus is intended to write information onto the recording body in such a way that signals are applied to the light writing element through a control circuit located outside to control the light emission or transmission of the light writing element LED's (light emitting diodes), Kerr cells which use the Kerr effect, liquid crystal light shutters and the like are usually employed as light writing elements, and a photosensitive body is used as the recording body.

For the purpose of light-writing onto the photosensitive body, it is necessary that the horizontal synchro signal for controlling the horizontal position of the photosensitive body, the vertical synchro signal for controlling the vertical position of the photosensitive body, the clock signal for generating various kinds of signals and use as a synchro signal, the recording data signal for selecting a drive pattern signal applied to the light writing element and the like, are applied to the drive circuit for the light writing element.

In the case of the conventional recording apparatus, all of the above-mentioned signals, the horizontal synchro signal, the vertical synchro signal, the clock signal and the like, except the recording data signal, are produced in the light writing element drive circuit (which will be hereinafter referred to as the drive circuit) and outputted to the host CPU and image reader which are connected to the drive circuit. Namely, the clock signal and the like, which have been produced in the drive circuit, are applied to the host CPU to control the synchronization between the recording data signal and the clock signal in the host CPU, and the clock signal is again applied to the drive circuit together with the recording data signal.

In the case of the conventional recording apparatus as described above, the clock signal is produced in the drive circuit and then returned to it through the host CPU. Particularly, the delay of the recording data, therefore, causes a problem in the liquid crystal recording apparatus and the like which are required to have high speed and density. In addition, the control between the clock signal and the transferred data signal is left entirely to the host CPU. In the case of forming a non-image area on the recording paper, therefore, the host CPU carries out the control of the drive circuit, thereby complicating the control.

Further, in the case where the recording data of the image reader is employed, ineffective data initially contained in CCD is outputted as the first recording data, and it is difficult to align effective data with the start position of image area.

SUMMARY OF THE INVENTION

The present invention is intended to eliminate the above-mentioned drawbacks, and the object of the present invention is therefore to provide a recording apparatus wherein the clock signal is produced in the host CPU while the effective writing signal is produced in the host CPU or image reader, and wherein, both of the signals are applied to the drive circuit for accurately light-writing on the photosensitive body, so that the blank area of the recording paper and the like can be substantially controlled by the drive circuit.

The object of the present invention can be achieved by a recording apparatus comprising a light shutter and control means for controlling the recording data applied to the recording electrodes of the light shutter, wherein the recording apparatus further includes first input means for inputting the recording data, second input means for indicating one line writing, third input means for confirming that the indication of the second input means can be effectively carried out, counter means for counting previously-set clocks, and means for preventing the recording data from being inputted to the input means in the case where the indication and confirmation signals are not inputted from the second and third input means when the counting of the counter means reaches the previously-set value.

BRIEF DESCRIPTION OF THE DRAWING

FIG. 7 shows an arrangement of the transferring papers.

FIGS. 8A and 8B show time charts of the present invention.

FIGS. 9A and 9B show conventional time charts.

FIG. 10 shows other time charts of the present invention.

DETAILED DESCRIPTION OF THE INVENTION

An embodiment of the present invention will be described referring to the accompanying drawings.

Figure 2:
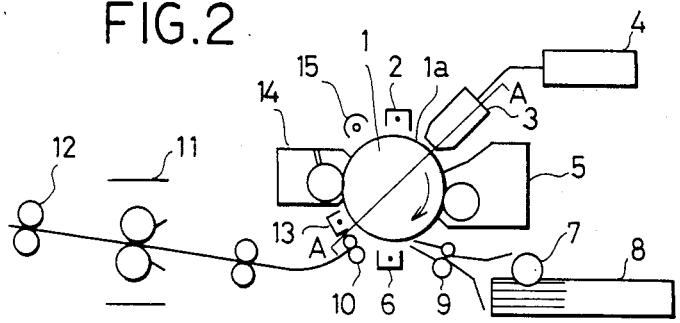
FIG. 2 shows an arrangement of the recording apparatus.

FIG. 2 shows an arrangement of the recording apparatus. In FIG. 2, the photosensitive surface 1a of a photosensitive drum 1 is previously and uniformly electrified by a charger 2 and a light writing section 3 is driven by a recording control section 4 to light-write on the photosensitive surface 1a so as to reproduce an electrostatic latent image thereon. The electrostatic latent image thus formed is developed by a developing means 5 and made visible with a toner. The toner image is transferred onto a sheet of transferring paper which is fed from a cassette 8 by means of a paper supply roller 7 and conveyed by rollers 9 at a timing which coincides with the toner image. After the transferring paper is separated by a separator means 10, it is discharged outside by discharge rollers 12 through a fixing means 11. Toner which has not been completely transferred by the transferring means 6 remains on the photosensitive surface 1a. Therefore, the load of the toner is neutralized by an electricity erasing means 13 and cleaned by a cleaning section 14. Load on the photosensitive surface 1a is further erased by an eraser 15 and the photosensitive surface 1a is uniformly electrified again by the charger 2, thereby becoming ready for a next light writing.

Figure 3:
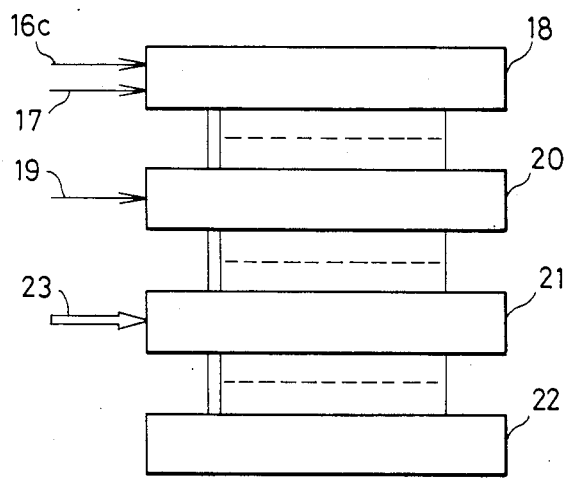
FIG. 3 is a block diagram showing a drive circuit for the liquid crystal light shutter.
Figure 4:
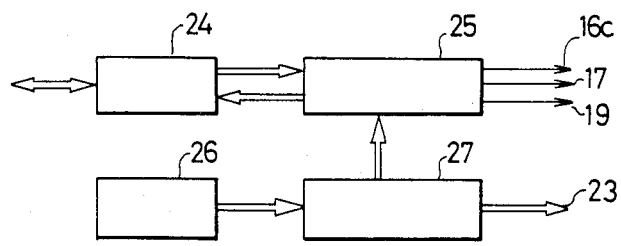
FIG. 4 is a block diagram showing the section for generating various kinds of drive signals.

FIGS. 3 and 4 show an arrangement of the recording control section 4 which is used with the above-described recording apparatus. In FIG. 3, recording data 16c is inputted to a shift register 18, synchronously with a transferring clock 17, and the n-bit recording data is held in the shift register 18. The recording data 16c is inputted to a data latch 20 responsive to a latch signal 19, and this recording data 16c, which corresponds to one line, is held in the data latch 20 while the next recording data 16c is inputted to the shift register 18. The recording data 16c, which has been held by the data latch 20, is inputted to a light shutter drive circuit 21 to select one of plural pattern signals 23 for driving a liquid crystal light shutter 22. The liquid crystal light shutter 22 is driven by this selected pattern signal 23.

FIG. 4 shows the arrangement of the recording control section 4 for producing the above-mentioned recording data 16c, transferring clock 17, latch signal 19 and plural pattern signals 23. An interface section 24 receives various kinds of information, such as a clock signal effective writing signal and recording data 16a applied from the host CPU located outside. A timing control section 25 controls the timing between the writing cycle of the liquid crystal light shutter and the reception of the recording data 16a, and it outputs the recording data 16c, which has been inputted to the interface section 24, to the shift register 18, in a serial manner. Output of an oscillator 26 is inputted to a timing signal generator section 27 to generate the transferring clock signal 17, latch signal 19 and drive pattern signals 23. The transferring clock signal 17 and latch signal 19 are outputted to the shift register 18 and data latch 20 through the timing control section 25, while the drive pattern signals 23 are outputted from the timing signal generator section 27 directly to the light shutter drive circuit 21.

Figure 1:
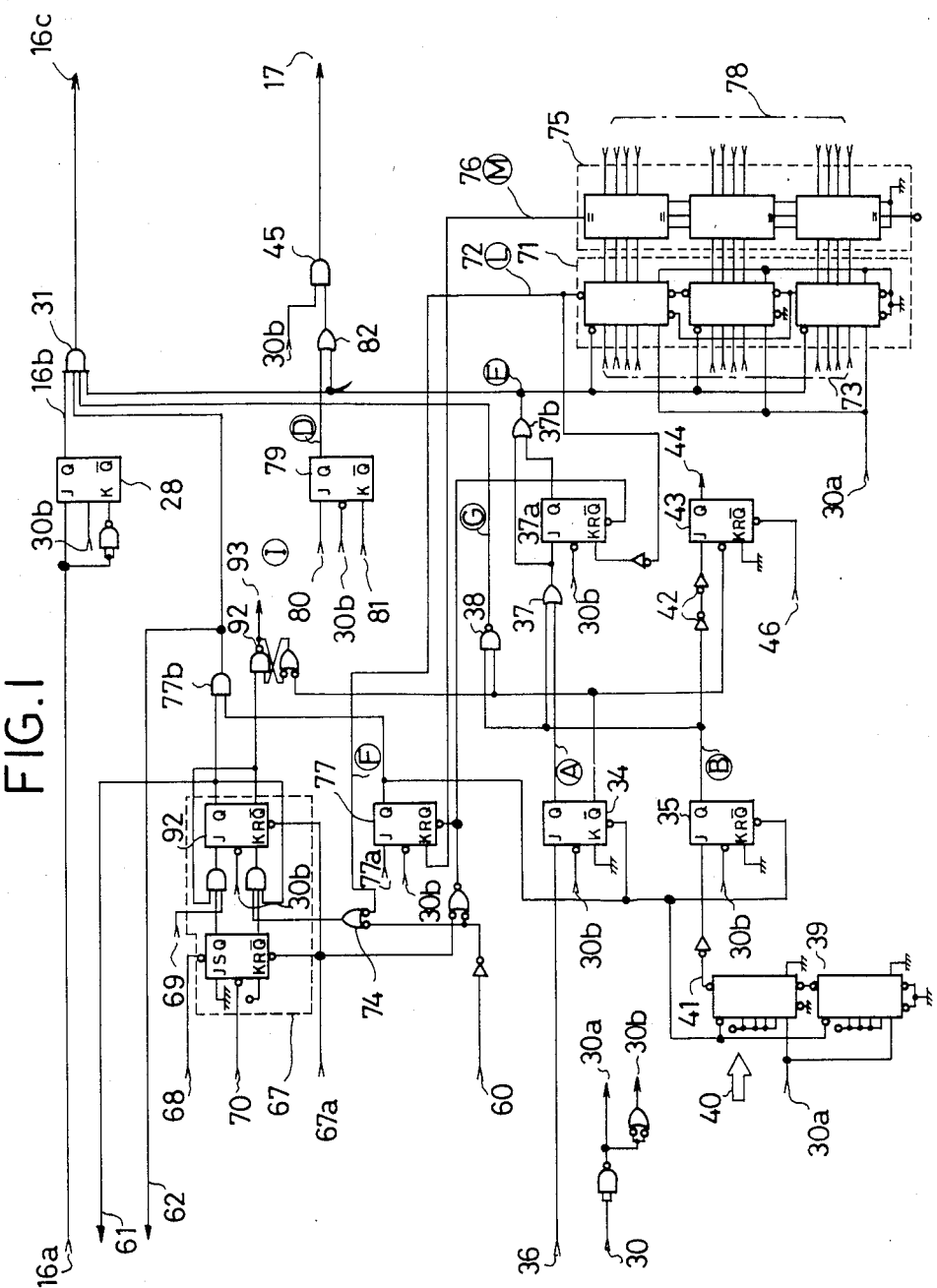
FIG. 1 is a circuit diagram of the timimg control section for use with the recording apparatus of the present invention.

The present invention can be realized when the timing control section 25 is arranged as shown in FIG. 1. Before FIG. 1 is explained, however, the main portion of the timing control section 25 will be described, referring to a circuit diagram shown in FIG. 5.

The recording data 16a, which is inputted to a terminal J of a J-K type flip-flop 28 (which will be hereinafter referred to as flip-flop) and another terminal K thereof through an NAND gate 32, is a signal inputted from the host CPU through the above-mentioned interface section 24, and it is outputted from the flip-flop 28 to an AND gate 31, as recording data signal 16b, synchronized with the rising of a clock signal 30 inputted from the host CPU through NAND gates 29a and 29b. A vertical synchro signal 33, which is produced by the timing control section 25, is inputted to terminals R of flip-flops 34 and 35, rendering them reset, and is kept waiting until an effective writing signal 36 is inputted from the host CPU. When the effective writing signal 36 is inputted to the flip-flop 34, an output (Q) of the flip-flop 34 is inputted to the AND gate 31 through an OR gate 37, while another output ($\overline{Q}$) of the flip-flop 34 is also inputted to the AND gate 31 through an NAND gate 38, to thereby open the AND gate 31, causing the recording data 16b, which is an output (Q) of the flip-flop 28, to be converted to the recording data 16c through the AND gate 31. This recording data 16c is outputted from the AND gate 31 to the shift register 18 shown in FIG. 3.

When the clock signal 30, which denotes that the counted number exceeds a pre-set value 40 which has been previously set in a counter 39 prior to the input of the effective writing signal 36, is inputted, a carry signal 41 is inputted from the counter 39 to a terminal J of the flip-flop 35, thereby preventing the recording data 16c from being outputted from the and gate 31 to the shift register 18 through the flip-flop 35 and NAND gate 38. It is imagined that all of the recording data 16a which corresponds to the line is not received in the case where the effective recording signal 36 is inputted later than the carry signal 41. An output-preventing signal which is to be outputted from the flip-flop 35 is outputted this time to a flip-flop 43 through a delay section 42, which consists of inverters, and when the clock signal is thereafter inputted from the flip-flop 34 to the flip-flop 43, an alarm signal 44 is outputted to inform that the recording on the page is abnormal.

After passing through the NAND gates 29a and 29b, the clock signal 30 is outputted as the transferring clock signal 17 to the shift register 18 through an AND gate 45 and used as a synchro signal for synchronizing with the above-mentioned recording data 16c. The flip-flop 43 is re-set by a re-set signal 46.

Figure 6:
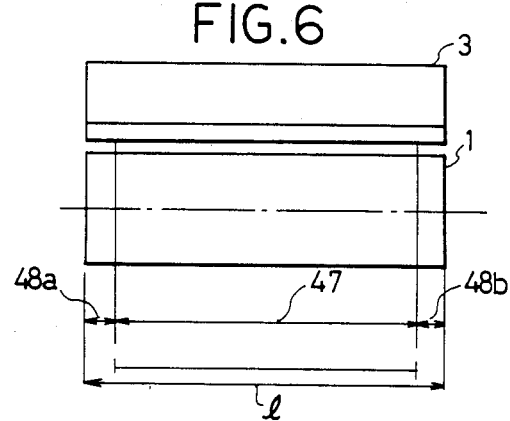
FIG. 6 shows the relation between the photosensitive drum and the light writing section.

The positional relation between the light writing section 3 and the photosensitive drum 1 is usually as shown in FIG. 6, which is a sectional view taken along the line A—A in FIG. 2, and the overall width l of the photosensitive drum 1 is equal the largest recording width 47 to which the light writing is applied, plus right and left non-recording widths 48a and 48b. When the largest recording width 47 is shown on the transferring paper, it equals the sum of a recorded width 50a of the largest-size transferring paper 49 and the right and left non-recorded widths 50b and 50c thereof as shown in FIG. 7. When a transferring paper 51 smaller in size than the transferring paper 49 is used, the recorded width 52a becomes smaller and the non-recorded width in this case is equal, therefore, to the sum of the non-recorded width 50c and the width 52b. Accordingly, those portions of the recording papers 49 and 51 to which the printing is applied, are represented by numerals 53 and 54, respectively. Their lengths, along which the printing is applied, are denoted by 56 and 55, while their non-recorded lengths are represented by 58a, 58b and 58a, 58c, respectively.

Using the transferring papers and the recording apparatus located as described above, the operation of recording the recording data 16a of the host CPU onto the transferring papers will be described with reference to a time chart shown in FIG. 8A.

Writing synchro signal 60, which is produced by the timing signal generator section 27 synchronously with the clock signal 30, is inputted to the timing control section 25. This writing synchro signal 60 is outputted with every certain clock signal 30, the vertical synchro signal 61 is outputted with every transferring paper, and the plural horizontal synchro signals 62 are outputted when one vertical synchro signal 61 rises. In the case where one hundred lines of printing are applied to a sheet of the transferring paper for example, one hundred of the horizontal synchro signals are outputted with every vertical synchro signal. Further, the effective writing signal 36 is outputted from the host CPU at the time when each of the horizontal synchro signals rise, so that the recording data 16a can be outputted, as the recording data 16c, to the register 18 through the flip-flop 28 and AND gate 31 of the timing control section 25, synchronously with the effective writing signal 36. Thereafter, it is held in the data latch 20 responsive to the latch signal 19. FIG. 8b shows the timings of the clock signal 30, writing synchro signal 60, vertical synchro signal 61, horizontal synchro signal 62, effecting writing signals 36a–36c, and recording data 16a for one writing time period T in FIG. 8A, using a time chart in which the above-described process is shown in more detail. It is shown, for example, that the effective writing signal 36a rises after the lapse of time period 65a since the horizontal synchro signal 62 has risen, and the recording data 16a is outputted at this time to the flip-flop 28, synchronously with the rising of the effective writing signal 36a. It is also shown that the effective writing signal 36b rises after the lapse of time period 65b since the horizontal synchro signal 62 has risen, and the recording data 16a is similarly outputted at this time to the flip-flop 28. It is further shown that the effective writing signal 36c rises after the lapse of time period 65c since the horizontal synchro signal 62 has risen, and the recording data 16a is similarly outputted at this time to the flip-flop 28. If the recording data 16a is outputted, as described above, to the flip-flop 28, synchronously with the effective writing signals, the foremost end of each of the recorded areas 53 and 54 on the transferring papers shown in FIG. 7 can be brought into coincidence with the foremost end of the recording data 16a. Namely, as shown by those conventional time charts in FIGS. 9A and 9B which correspond to the ones shown in FIGS. 8A and 8B, the recording data 16a is not outputted, completely synchronously with the horizontal synchro signal 62. It does not happen, therefore, that the foremost end position 53a is shifted from the foremost end of the recording data 16a because of the delay of the clock signal 30. The horizontal synchro signal 62 is not used as the signal for inputting the recording data 16a in the case of the present invention, and the timing of the horizontal synchro signal 62 may be thus roughly controlled.

FIGS. 10A through 10C are time charts showing the timing relations of the horizontal synchro signal 62, effective writing signal 36, an output A of the flip-flop 34, an output B of the flip-flop 35, an output G of the NAND gate 38, and the alarm signal 44 in relation to a time period $T_{VD}$ which lasts until the carry signal 41 is outputted. When the horizontal synchro signal 62 is generated synchronously with the rising of the clock signal 30 in FIG. 10A, it is inputted to a load input of the counter 39, which starts its counting responsive to the subsequent falling of the clock signal 30. When its counted number reaches the pre-set value 40, the carry signal 41 is inputted to the terminal J of the flip-flop 35. In FIG. 10A, therefore, the effective writing signal 36 has been inputted to the flip-flop 34 within the time period $T_{VD}$ and the normal recording data 16c is thus outputted to the shift register 18. When no effective writing signal 36 is inputted at all during the time when the horizontal synchro signal 62 is rising, as shown in FIG. 10B, the recording data 16c is not outputted to the shift register 18 but waits for the input of the next horizontal synchro signal 62. When the effective writing signal 36 is inputted after the lapse of the time period $T_{VD}$, as shown in FIG. 10C, the alarm signal 44 is generated outside to display the occurrence of an error, so that the process of removing the fed transferring paper can be employed.

Figure 5:
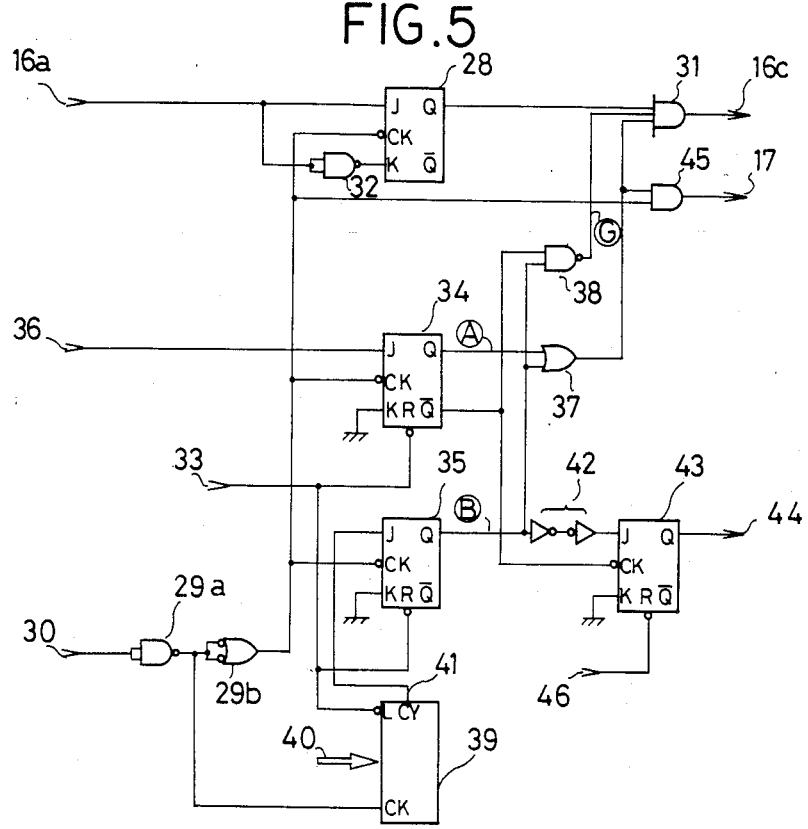
FIG. 5 is a circuit diagram showing the timing control section.

The operation of the timing control section 25, shown in FIG. 4, will be described citing the circuit shown in FIG. 1. The main portion of the circuit shown in FIG. 1 is similar to the one shown in FIG. 5 and the same parts as those in FIG. 5 will be represented by the same numerals but a description of these parts will be omitted. What is different from FIG. 5 is a circuit for controlling the horizontal and vertical synchro signals 62 and 61. The verical synchro signal 61 rises, synchronizing with a timing signal 69 and responsive to a start signal 68 inputted to a vertical synchro signal control section 67 and applied from a microprocessor (not shown), and it falls responsive to an end signal 70 similarly applied from the microprocessor. Flip-flops in the vertical synchro signal control section 67 are re-set by a re-set signal 67a. An output signal 72 for indicating the rising of the horizontal synchro signal is inputted to the vertical synchro signal control section 67 through an NAND gate 74. Considering the case where no output signal 72 is generated for some reason, the writing synchro signal 60 is also inputted to the vertical synchro signal control section 67 through the NAND gate 74, thereby making it possible to cause the vertical synchro signal 61 to fall.

The horizontal synchro signal 62 rises after the vertical synchro signal 61 has risen, and it falls responsive to an output signal 76 of a comparator 75 and the like. Namely, a number of dots which correspond to the largest printing width has been previously inputted, as a pre-set value 73, to a horizontal dot counter 71. The numbers of dots which correspond to the sizes of the transferring papers 49 and 51 have been previously inputted, as pre-set values 78, to the comparator 75. When the vertical dot counter 71 counts the clock signals 30a and its counted number becomes equal to the pre-set value 78 in the comparator 75, the output signal 76 is outputted to a flip-flop 77, where it makes the horizontal synchro signal 62 fall through an AND gate 77b, synchronously with the clock signal 30a. The time during which the horizontal synchro signal 62 is rising can be therefore determined by the pre-set value 78. When the pre-set value 73, pre-set in the counter 71, is counted out, the output signal 72 is inputted to the above-mentioned vertical synchro signal control section 67 through the NAND gate 74.

Timing signals 80 and 81 are inputted to a flip-flop 79, synchronously with the clock signal 30b, to produce an output (or signal D) of the flip-flop 79 for controlling the left blank portion 50b in FIG. 7. When the effective writing signal 36 is not inputted to the flip-flop 34 within the time period $T_{VD}$, a signal outputted through the OR gate 37 is further inputted to an OR gate 82 through the flip-flop 37a and OR gate 37b and a white printing signal is produced through the OR gate 82. It is masked by the clock signal 30b through the AND gate, and outputted, as the transferring clock signal 17, to the shift register 18.

Figure 12:
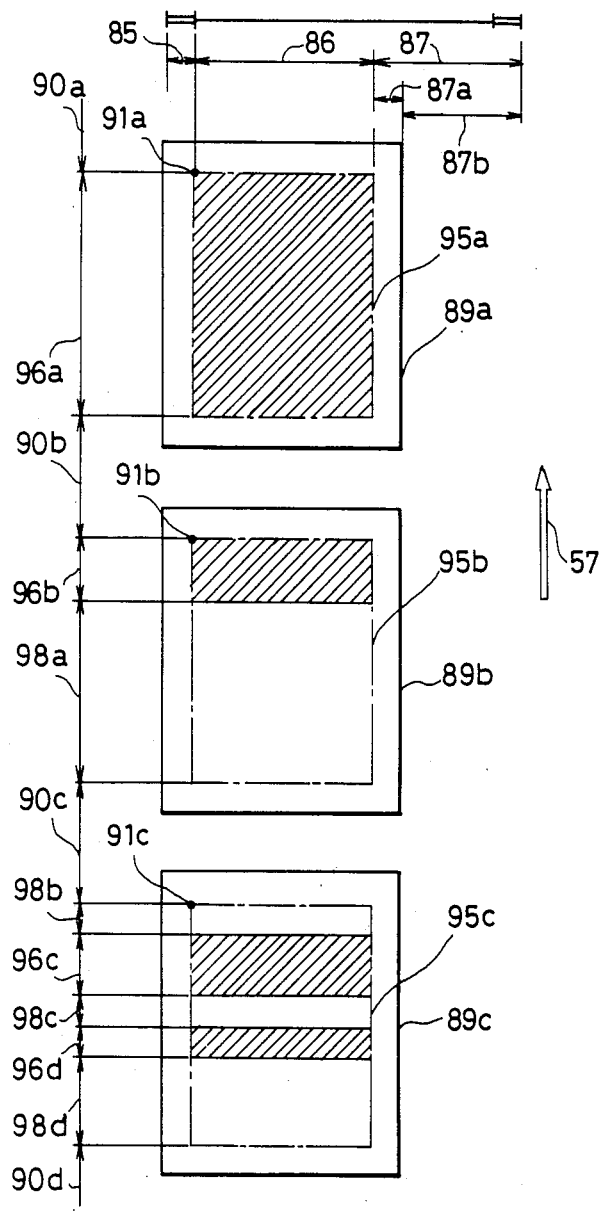
FIG. 12 is intended to explain the printing on the transferring paper.
Figure 13:
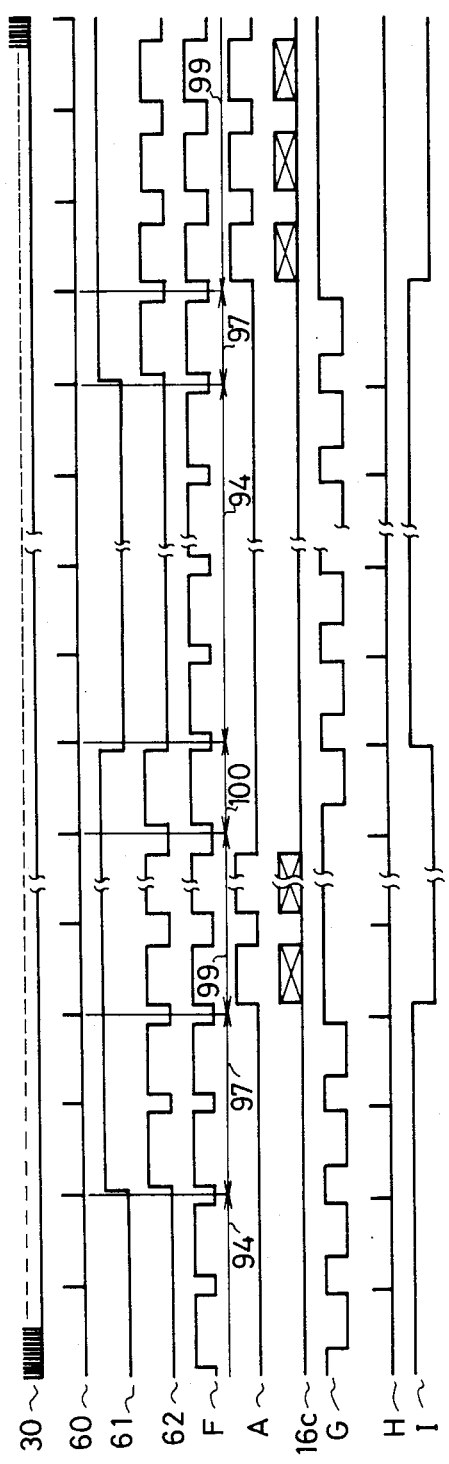
FIG. 13 is a time chart for explaining FIG. 12.

The operation of the recording apparatus provided with the above-described timing control section 25 will be described referring to FIGS. 11 through 13. It is assumed that the number of dots formed by the light shutter is n. The signal D used in time charts in FIGS. 11 and 13 represents the output of the flip-flop 79. Signal E denotes the output of the OR gate 37b and signal F the output of the flip-flop 77. Signal A, B and C represent those outputs already described above.

Figures 11A, 11B:
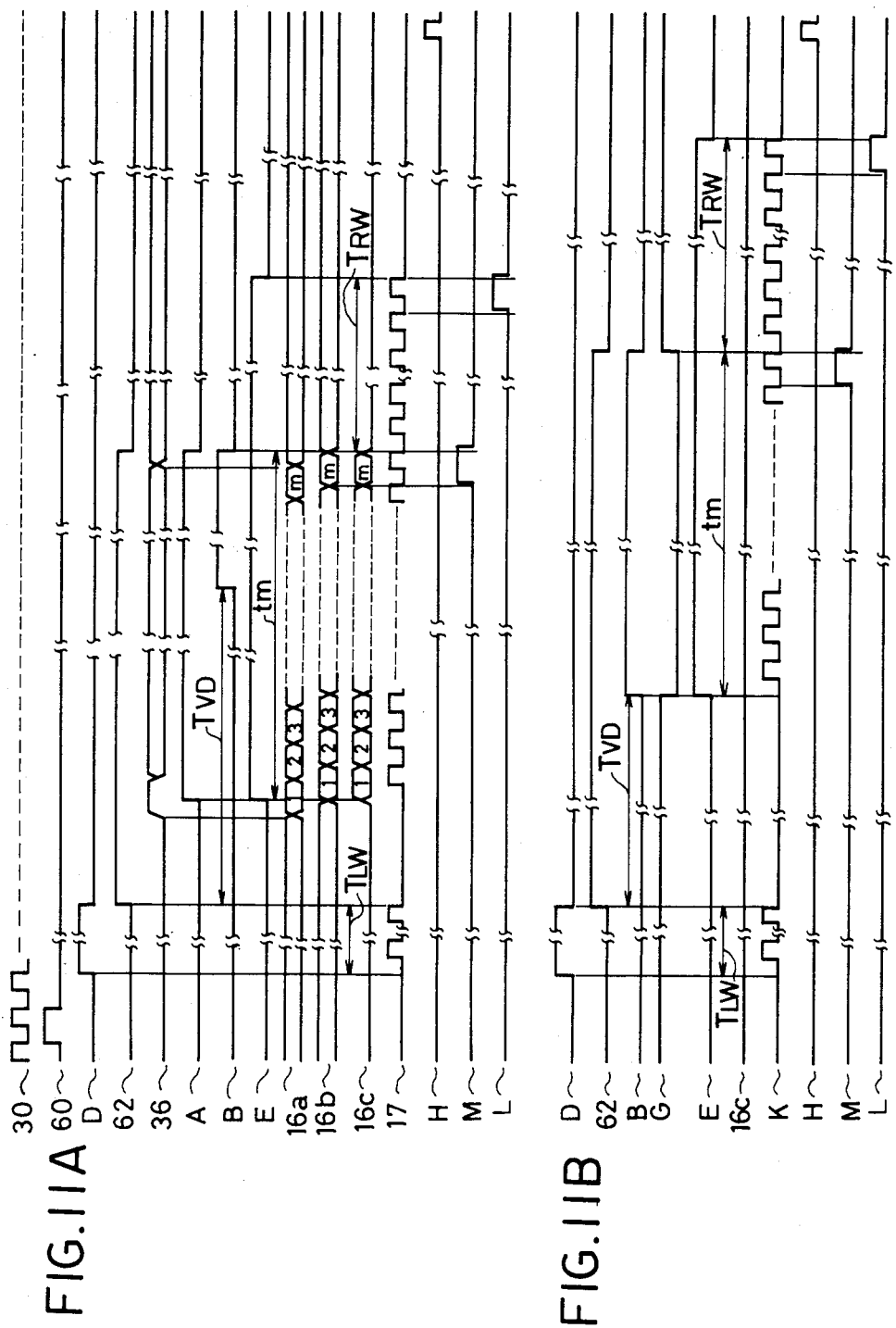
FIGS. 11A and 11B show further time charts of the present invention.

When the effective writing signal 36 is inputted to the flip-flop 34 through the interface section 24, as shown in FIG. 11A, the recording data 16a is inputted to the flip-flop 28 at the same time, and the recording data 16a is outputted, as the recording data 16c, serially from the flip-flop 28 to the shift register 18 through the AND gate 31 for a time period tm. This recording data 16c selects the drive pattern signal 23 in the light shutter drive section 21 shown in FIG. 3 to drive the liquid crystal light shutter 22.

The alignment of the recording data 16c with each of foremost end portions 91a–91c of recorded area 86 can be achieved in such a manner that the foremost end signal 93 is outputted from the foremost end control flip-flop 92 shown in FIG. 1 after the rising of the vertical synchro signal 61 to control the rollers 9 shown in FIG. 2. A time period $T_{LW}$ during which a left blank portion 85 is formed, is controlled by the output signal D of the flip-flop 79, which is produced by timing signals 80, 81 and the clock signal 30b.

The foremost end positions 91a–91c of the recorded area 86 are aligned with, and not shifted from the foremost ends of the printed areas 96a–96c, even when the photosensitive drum 1 moves in the direction 57. Namely, the recording data 16c is inputted to the shift register 18, synchronously with the effective writing signal 36 inputted from the host CPU. It does not happen, therefore, that ineffective data is outputted from the CPU corresponding to the foremost end positions 91a–91c, respectively, and that the clock signal is delayed.

A right blank portion 87 can be formed in such a way that the horizontal synchro signal 62 falls by the values 73 and 78 pre-set in the counter 71 and comparator 75, that the AND gate 31 is closed, and that the recording data 16c is not, but the transferring clock signal 17 is supplied to the shift register 18 for a time period $T_{RW}$.

A non-printed area in the recorded areas 95a–95c can be formed in such a manner that the recording data 16c is not applied to the shift register 18, but only the transferring clock signal 17 is forwarded for the time period tm in the case where the effective writing signal 36 is not inputted after the horizontal synchro signal 62 rises, but before the carry signal 41 rises, as shown in FIG. 11b. The subsequent process for the subsequent time period $T_{RW}$ is carried out at the same time when the right blank portion 87 is formed.

Each of intervals 90a–90d between transferring papers 89a–89c is controlled by the micro-processor which outputs the start and end signals 68 and 70.

In the case where the effective writing signal 36 is not received after the vertical and horizontal synchro signals 61 and 62 rise, and the time period during which no signal A is generated, is therefore long, as shown in FIG. 13. That is, when the time period, during which the transferring paper is waiting between the rollers 9 is long, it is imagined that the photosensitive surface 1a is broken because white printing is applied to the photosensitive surface 1a for a long time. It may be arranged in this case that means (not shown), after a certain time period, informs of the danger outside by an alarm.

According to the present invention as described above, particularly the recording data 16c can be aligned in a certain position on the transferring paper on which any white portion can be automatically formed. In addition, the clock and effective writing signals 30 and 36 are generated through the host CPU and the like and inputted to the timing control section 25, so that the synchronization and the like between the clock signal 30 and the recording data 16a can be more easily controlled. The delay of the clock signal 30 can also be prevented to thereby driving the recording apparatus at higher speed. The timing control of the horizontal and vertical synchro signals 61 and 62 may be carried out more roughly than in the conventional case.

Although the present invention has been embodied as the circuits shown in FIGS. 1 and 5, it should be understood that the present invention can be embodied using the other circuits and the like. It should also be understood that the present invention can be applied to the recording apparatus which employs electrostatic elements and thermo-elements, as well as the one which uses the liquid crystal light shutter.

According to the present invention as described above in detail, the clock signal is derived from means located outside, or external to, the recording apparatus such as the host CPU, and the effective writing signal is also derived therefrom at the same time, so that the transmission of recording data from means located outside the recording apparatus can be made more flexible. In addition, the outside-located means can control the input timing of recording data and it is therefore unnecessary to so accurately control the timing of the vertical and horizontal synchro signals as in the conventional case, thereby enabling the control circuit to be more simplified. Further, the process of automatically forming the white portions in the recorded area can be more easily carried out by the outside-located means and the foremost end portion of the recorded area can be more accurately aligned with the start position of recording data.

What is claimed is:

1. A recording device including a plurality of printing dot generating means arranged in a main scanning direction having recording electrodes and control means for controlling waveforms applied to said recording electrodes responsive to recording data applied from means external to said recording device, said recording device comprising:
    (a) recording data processing means having an input for receiving said recording data and for controlling outputs applied to said control means;
    (b) first input means for receiving reference clock pulses from said external means for processing said recording data; and
    (c) second input means for receiving an effective recording data signal from said external means for indicating effective recording data.

2. The recording device according to claim 1 further comprising counter means comprising an output for outputting a stop signal when said reference clock pulses exceed a predetermined numrber before said effective recording data signal is input from said external means, wherein said recording data processing means prevents output of said recording data responsive to output of said stop signal.

3. The recording device according to claim 2 wherein said counter means comprises a first input for receiving a predetermined number of previously-set values.

4. The recording device according to claim 2 wherein said counter means comprises means for generating an alarm signal for indicating that reception of said recording data is not good, said alarm signal being generated substantially simultaneously with the output of said stop signal.

5. The recording device according to claim 1 wherein said printing dot generator means comprises liquid crystal shutters.

6. The recording device according to claim 1 wherein said recording data processing means comprises:
   (a) a flip-flop having three inputs and one output, a first of said input for receiving said recording data, and a second of said inputs for receiving a clock pulse;
   (b) a NAND-gate connected to a third of said inputs; and
   (c) an AND-gate connected to said output.

7. The recording device according to claim 1 wherein said first input means comprises:
   (a) a first NAND-gate having an input for receiving said reference clock pulses and an output for outputting a first clock pulse; and
   (b) a second NAND-gate having two inputs connected to said output of said first NAND-gate and an output for outputting a second clock pulse.

8. The recording device according to claim 1 wherein said second input means comprises a flip-flop having a first input for receiving said effective recording data signal, a second input for receiving a clock pulse, a third input connected to ground and two outputs operatively connected to said recording data processing means.

9. The recording device according to claim 4 wherein said counter means comprises:
   (a) a counter comprising said first input for receiving said predetermined number of previously-set values, an input for receiving a first clock pulse, and an output for generating a carry signal;
   (b) a first flip-flop having a first input for receiving said carry signal, a second input for receiving a second clock pulse, a third input connected to ground, a fourth input for receiving a reset signal and an output;
   (c) a second flip-flop having a first input operatively connected to said output of said first flip-flop, a second input, a third input connected to ground and an output for outputting said alarm signal; and
   (d) a delay section comprising two serially connected inverters connected between said output of said first flip-flop and said first input of said second flip-flop.

10. A recording device including a plurality of light dot generator means arranged in a main scanning direction, control means for controlling waveforms applied to said light dot generator means responsive to recording data applied from means external to said recording device, a photosensitive body on which electrostatic latent images are formed by said light dot generator means, developing means for developing said electrostatic images, and transfer means for transferring developed images onto sheets of paper, said recording device further comprising:
   (a) recording data processing means for controlling outputs applied to said control means and having an input for receiving said recording data applied from said external means;
   (b) size storing means for storing numerical values representing sizes of paper used by said recording device;
   (c) dot number storing means for storing the largest number of printing dots which represents the maximum width of printing dots in said main scanning direction;
   (d) counter means for counting clock pulses applied from said external means and generating an output signal; and
   (e) horizontal synchronizing signal generator means for generating a horizontal synchronizing signal, which represents said largest number of printing dots in said main scanning direction, responsive to a number stored in said size storing means and said output signal.

11. The recording device according to claim 10 wherein said horizontal synchronizing signal is applied to said external means.

12. The recording device according to claim 10 further comprising largest printing width output means for outputting a largest printing width signal, representing the largest printing width, responsive to the number stored in said dot number storing means and said output of said counter means, and wherein said recording data processing means applies non-printing data to said control means and said printing width signal is output after said horizontal synchronizing signal ends.

13. The recording device according to claim 10 wherein said light dot generator means comprises liquid crystal shutters.

14. The recording device according to claim 10 wherein said recording data processing means comprises:
   (a) a flip-flop having three inputs and one output, a first of said inputs for receiving said recording data, and a second of said inputs for receiving a clock pulse;
   (b) a NAND-gate connected to a third of said inputs; and
   (c) an AND-gate connected to said output.

15. The recording device according to claim 10 wherein said horizontal synchronizing signal generator means comprises:
   (a) a flip-flop having a first input connected to said counter means, a second input for receiving a clock pulse, a third input and an output; and
   (b) an AND-gate connected between said output and said recording data processing means.

16. A method of operating a recording device to set a printing area on a printing sheet and record an image thereon, comprising the steps of:
   (a) recording data into recording data processing means from means external to said recording device;
   (b) receiving an effective writing signal from said external means;
   (c) outputting a horizontal synchronizing signal from horizontal synchronizing signal generator means;
   (d) printing said recording data on said printing sheet when said effective writing signal is received within a predetermined time interval after said horizontal synchronizing signal is output; and
   (e) generating an alarm signal when said effective writing signal is received after said predetermined time interval.

17. The method according to claim 16 further comprising the steps of:
   (a) generating a stop signal when said effective writing signal is received after said predetermined time interval; and
   (b) preventing the printing of said recording data in response to said stop signal.

* * * * *

UNITED STATES PATENT AND TRADEMARK OFFICE
CERTIFICATE OF CORRECTION

PATENT NO. : 4,649,404
DATED : October 28, 1985
INVENTOR(S) : Morio OHTA et al.

It is certified that error appears in the above-identified patent and that said Letters Patent is hereby corrected as shown below:

In the Abstract, in line 1, ---of--- should be inserted after "capable";

In the Abstract, line 9 of the printed patent, ---,--- should be inserted after "outside";

At column 1, line 14 of the printed patent, ---.--- should appear after "element";

At column 2, line 22 of the printed patent, "timimg" should be changed to ---timing---;

At column 4, line 11 of the printed patent, "and" should be changed to ---AND---;

At column 6, line 11 of the printed patent, "verical" should be changed to ---vertical---;

At column 6, line 11 of the printed patent "synchronizing" should be changed to ---synchronously---;

At column 8, line 24 of the printed patent, "the outside-located means" should be changed to ---means located outside the recording apparatus---; and At column 8, line 55 of the printed patent, "numbrer" should be changed to ---number---;

UNITED STATES PATENT AND TRADEMARK OFFICE
CERTIFICATE OF CORRECTION

PATENT NO. : 4,649,404

DATED : October 28, 1985

INVENTOR(S) : Morio Ohta et al.

It is certified that error appears in the above-identified patent and that said Letters Patent is hereby corrected as shown below:

At column 10, line 60 of the printed patent (in claim 17), "16" should be changed to --- 10 ---.

Signed and Sealed this

Twenty-fourth Day of November, 1987

Attest:

DONALD J. QUIGG

Attesting Officer

Commissioner of Patents and Trademarks